United States Patent [19]

Ducol et al.

[11] Patent Number: 5,053,269

[45] Date of Patent: Oct. 1, 1991

[54] STABILIZING SHEET WITH A HEATING INSERT FOR ABOVEGROUND CULTIVATION AND FOR A PROTECTED-CROP CONTAINER PLATFORM

[75] Inventors: Jean P. Ducol, Tarare; Serge Lepage, Mornant, both of France

[73] Assignee: Notex S.A., Turdine, France

[21] Appl. No.: 543,420

[22] Filed: Jun. 26, 1990

[30] Foreign Application Priority Data

Jan. 9, 1990 [FR] France .............................. 89 00340

[51] Int. Cl.$^5$ .............................................. B32B 7/00
[52] U.S. Cl. .................................. 428/253; 428/107; 428/109; 428/247; 428/257
[58] Field of Search .................... 428/253, 36.1, 107, 428/109, 247, 257, 105

[56] References Cited

U.S. PATENT DOCUMENTS

| | | | |
|---|---|---|---|
| 4,518,640 | 5/1985 | Wilkens | 428/253 |
| 4,532,163 | 7/1985 | Hoppie | 428/247 |
| 4,606,968 | 8/1986 | Thornton | 428/253 |
| 4,681,783 | 7/1987 | Hyodo et al. | 428/36.1 |
| 4,690,850 | 9/1987 | Fezio | 428/107 |
| 4,784,886 | 11/1988 | Monget et al. | 428/36.1 |
| 4,818,316 | 4/1989 | Weinle et al. | 428/253 |
| 4,857,379 | 8/1989 | Plontges et al. | 428/105 |
| 4,946,722 | 8/1990 | Moyer | 428/36.1 |

FOREIGN PATENT DOCUMENTS 2555724  7/1988  France .
0094887  4/1988  Japan .

Primary Examiner—James J. Bell
Attorney, Agent, or Firm—Parkhurst, Wendel & Rossi

[57] ABSTRACT

Material allowing the production of surfaces for aboveground cultivation and for container platforms.

It is defined in that:

it is present in the form of a textile sheet consisting of a structure made on a Raschel-type knitting machine with the insertion of transverse threads (2) and longitudinal threads (1), these threads (1) and (2) being arranged without any shrinkage inside a meshed-thread structure (3) ensuring their retention relative to each other, and at least one continuous heating resistor (4) is incorporated parallel to the transverse (2) and/or longitudinal (1) threads inside the mesh structure (3) and this is in a specified sequence.

7 Claims, 6 Drawing Sheets

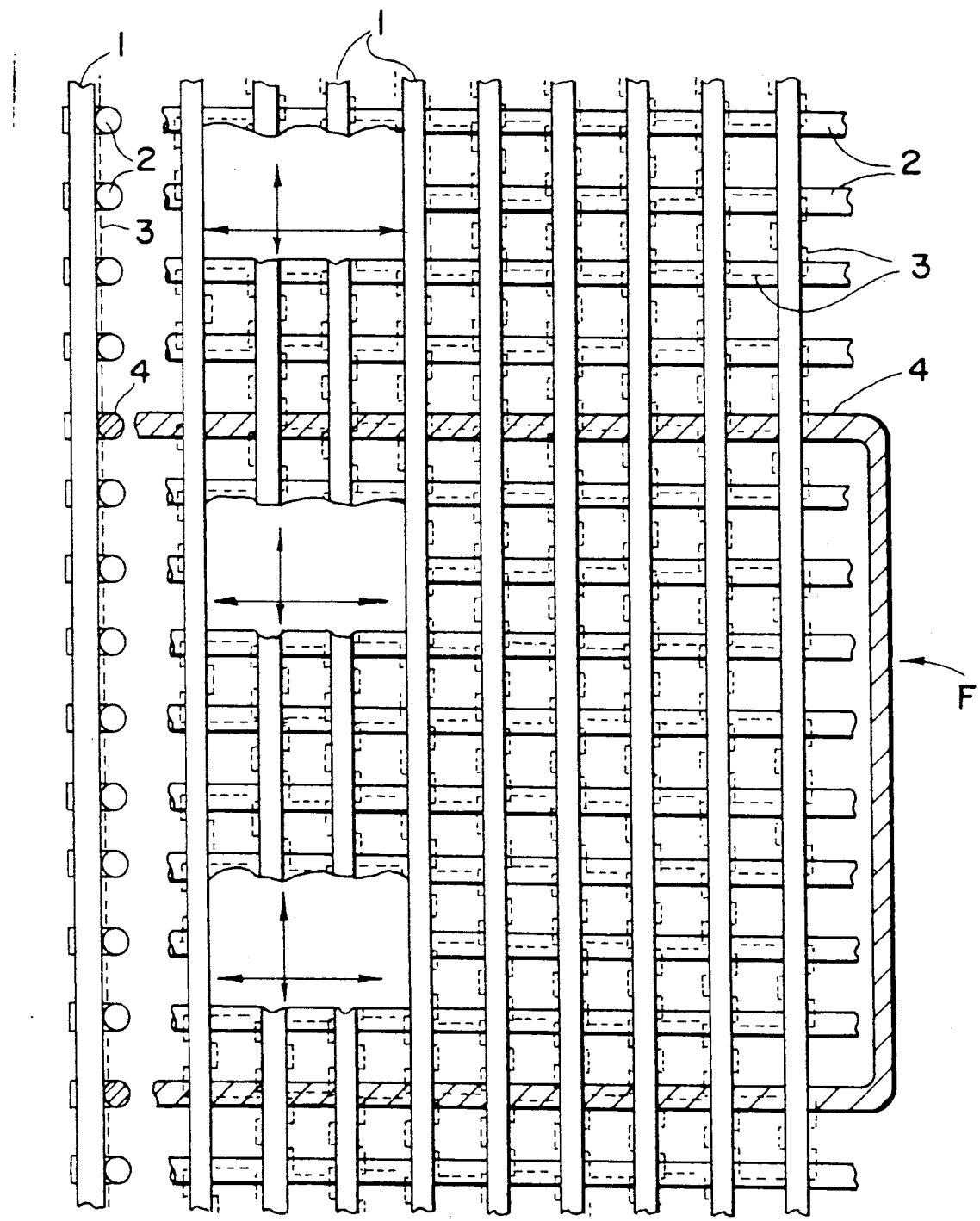

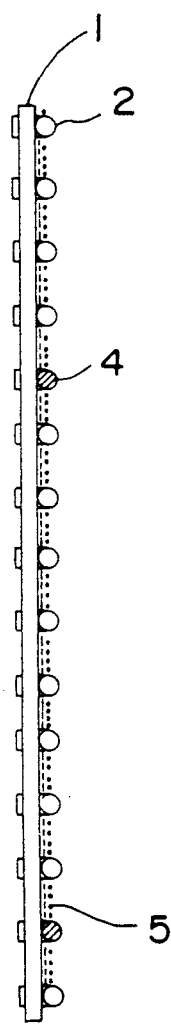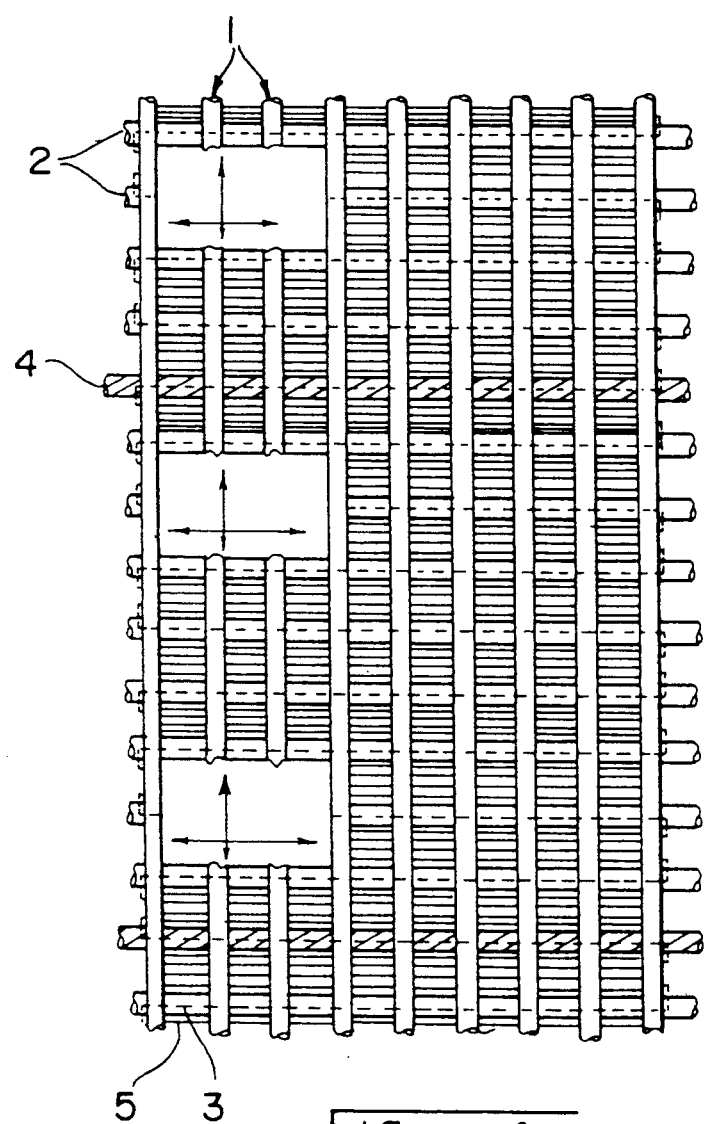
Fig_5   Fig_4

STABILIZING SHEET WITH A HEATING INSERT FOR ABOVEGROUND CULTIVATION AND FOR A PROTECTED-CROP CONTAINER PLATFORM

The present invention relates to a novel type of material which can be used to produce platforms and/or aboveground-cultivation zones for which the problem exists, in particular, of creating a surface which does not serve as a growing area but as a support element for containers enclosing plants to be cultivated.

In order for it to be implemented, this aboveground-cultivation technique requires a substantial amount of civil engineering work, in particular in order to transform an agricultural-type soil into an appropriate cultivation zone so as to create the platform serving as a support for the containers.

Indeed, in order to obtain this type of surface, the existing soil should first be broken up, and the area then cleared of stones, compacted, leveled and stabilized. Weed infestation and the rooting of the seedlings cultivated inside the containers should usually also be prevented. In order to carry out this latter function, woven or nonwoven cloths which enable a mulching of the soil to be realized are currently very frequently used.

Once the growing surface has been created for the holding, after the containers have been positioned, conventional watering, weeding, spacing, cleaning etc., operations must be performed in order to ensure the growth of the plants.

Zones must therefore be provided for these operations for the workers to pass along and for the machines to move along, which therefore generate localized differential settlements and deep tracks, as well as the destruction of "mulching" material which may have been laid on the soil.

Lastly, the important problem arises in this type of cultivation of protection against frost in the winter period and in the early part of the season, given that the roots of the seedlings are not protected as in the case of conventional outdoor cultivation. In order to solve this latter problem, the only solution proposed up until now consists in making shelters and covers, but not only does this cost a great deal and require a large workforce, but it also gives uncertain results in the agronomical and technical field.

Now a material has been found, and this is what forms the subject of the present invention, which enables platforms for the aboveground cultivation of container plants to be made in a simple and effective manner, enabling all of these problems to be overcome and not only enabling mechanical properties to be imparted to the platform enabling the movement and passage of heavy machines by way of a better distribution of loads, but also which promotes growth by virtue of the fact that it enables moisture to be better distributed, eliminates the risks from frost since it enables the soil to heat up if desired, and may lastly, if necessary, play the role of a complete blanket element.

In a general manner, the novel material according to the invention enabling the production of surfaces for aboveground cultivation is defined in that:

it is present in the form of a textile sheet consisting of a structure made on a Raschel-type knitting machine, with the insertion of transverse threads (termed "weft threads") and longitudinal threads (termed "warp threads"), these weft and warp threads being arranged without any shrinkage inside a meshed-thread structure ensuring their retention relative to each other, and at least one continuous heating resistor is incorporated parallel to the longitudinal and/or transverse threads inside the mesh structure in a specified sequence.

"Continuous heating resistors" is understood to mean, within the sense of the present invention, that the heating element is continuous and is incorporated directly when the fabric is being made and extends over the entire length and/or width of the latter. In a general manner, it may be said that these heating resistors form a structure similar to that forming the subject of the French Patent 83 18974 (Published Specification: 2,555,724). The invention will be described more particularly in the description which follows for embodiments in which the heating element or elements are arranged transversely, but it is evident that the invention also covers the case where at least one heating resistor is arranged longitudinally.

So as to be able to meet the conditions demanded for the use of such a sheet not only as an element for heating the soil as was envisaged in the abovementioned patent but also as a stabilizing and a load-distributing element enabling any wheeled machines to pass along, according to the invention:

the longitudinal threads and the transverse threads (warp and weft) will be selected from those threads having a good mechanical performance and are arranged relative to each other without any shrinkage;

the heating resistor has a structure such that it may elongate without breaking during the deformations and therefore has an elongation capacity greater than that of the textile structure; by way of a guide, a resistor will be used as the heating resistor which consists, for example, of a conducting wire coiled helically around an extendable core, having a good resistance and a good temperature resistance, this complex unit being covered with a protective sheath, for example an extruded one. Moreover, when the material is used, it is advantageous to arrange it on the soil such that the longitudinal threads are situated toward the outside and the transverse threads are located for their part in contact with the soil.

Depending on the applications, additional elements may also be incorporated inside the abovementioned basic structure. Thus, although it is possible for some applications to have an assembly in the form of an openwork grid, the weft and warp threads being held spaced apart from each other, for other applications additional weft and/or warp filler threads may be arranged between the strengthening weft and warp proper with a view not only to increasing the mechanical strength of the structure but also to obtaining a complete blanket-covering of the soil. Such weft and warp filler threads will advantageously be based on bulked yarns such as, for example, textured yarns.

Textile yarns having a good resistance to weather and to ultraviolet rays such as, for example, polypropylene or polyethylene fibers will, moreover, be used as the textile substance involved in the production of such a material.

The invention and the advantages which it provides will, however, be better understood from the exemplary embodiments given hereinbelow as a guide but with no limitation being implied and which are illustrated in the attached diagrams, in which:

FIGS. 1 and 2 are respectively schematic plan and side views in the warp direction of the weave (structure) of a material according to the invention;

FIGS. 4 and 5 are views similar to FIGS. 1 and 2 of an alternative material according to the invention into which additional filler threads are incorporated in addition to the longitudinal reinforcing threads and the heating wires, enabling a blanket sheet to be obtained.

EXAMPLE 1

Figure 3:
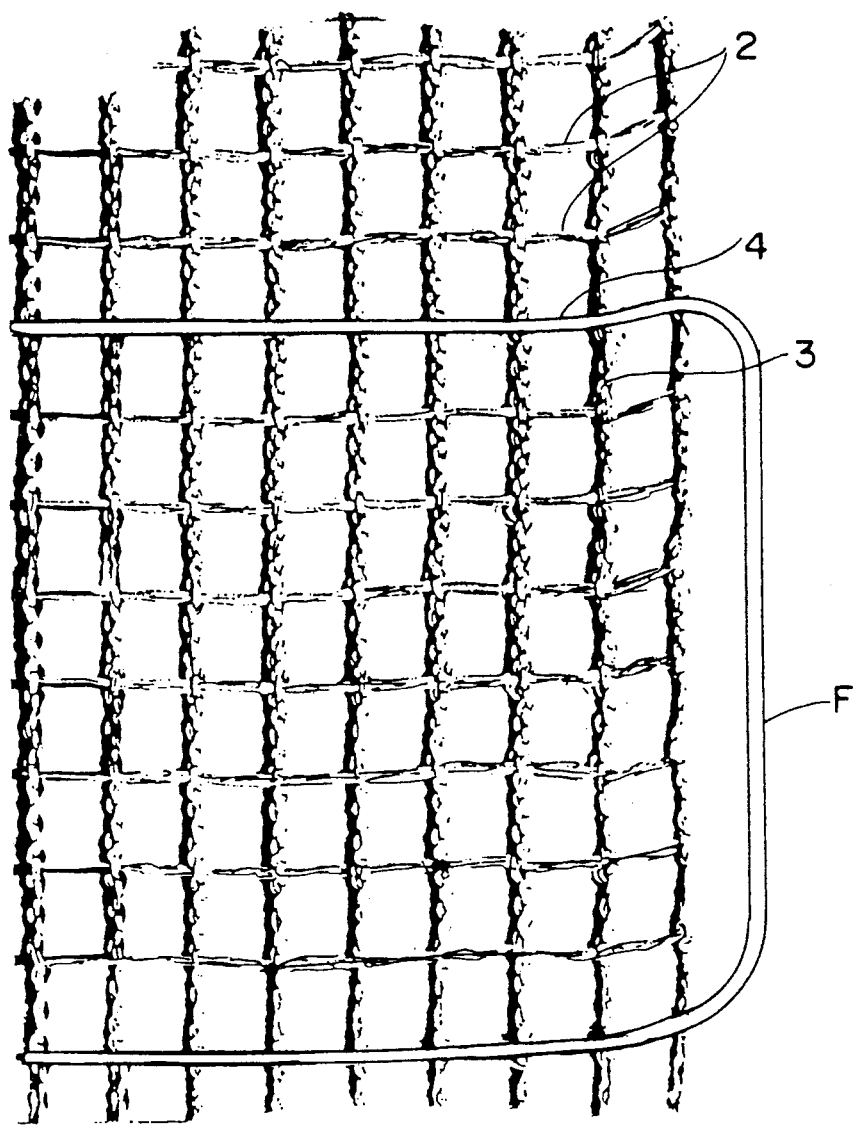
FIG. 3 is a photocopy of the material obtained with the weave forming the subject of FIGS. 1 and 2.
Figure 6:
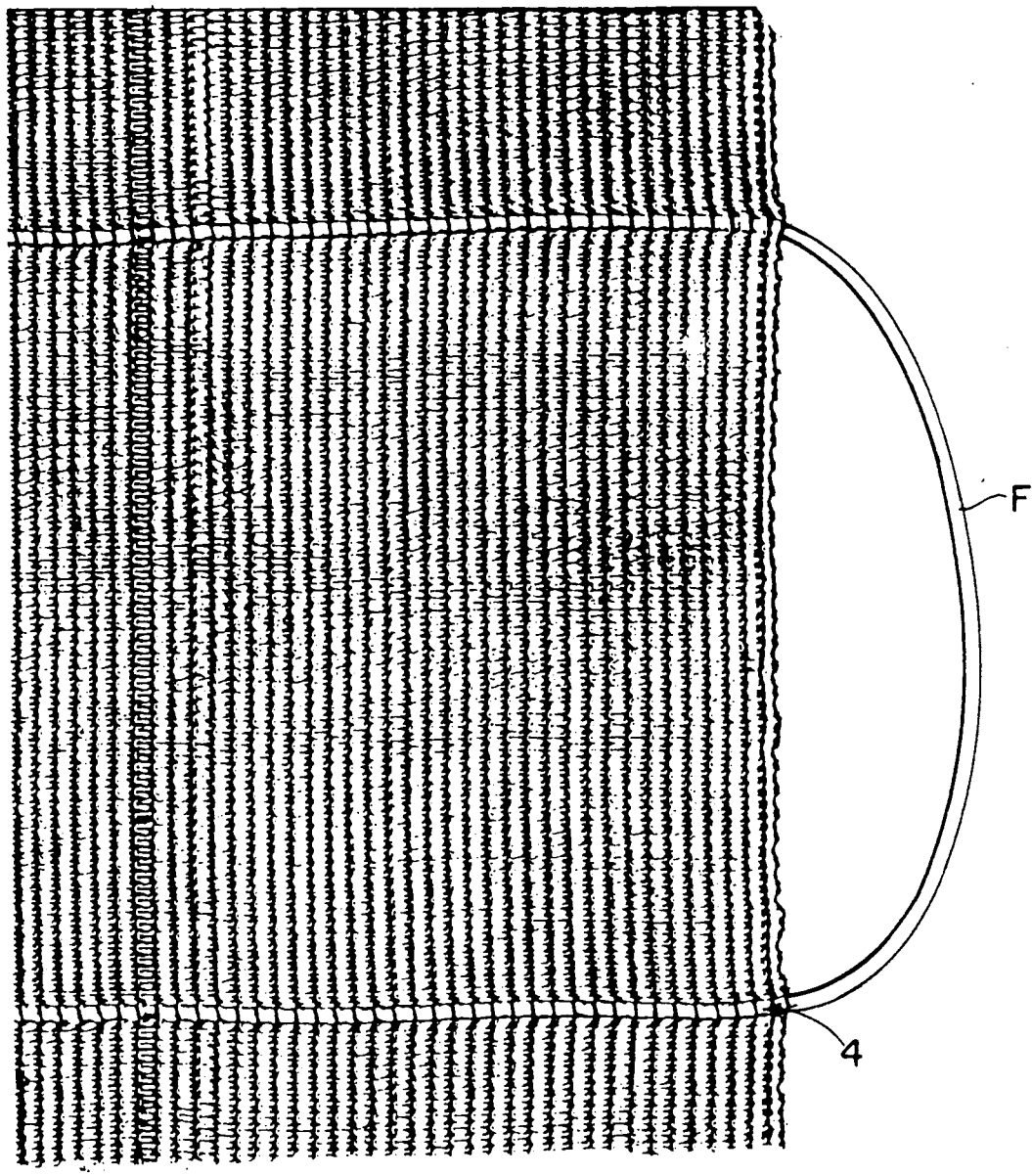
FIG. 6 is a photocopy of a material obtained by means of the weave forming the subject of FIGS. 3 and 4.

A material according to the invention of the type illustrated in FIGS. 1, 2 and 3 is produced on a Raschel knitting machine manned by a weaver.

As is evident from these figures, such a material essentially consists of longitudinal threads (warp threads) (1) and transverse threads (weft) (2) in the form of two superposed sheets. The joining together of the threads (1) and (2) is obtained in a conventional manner by a mesh structure (3) (shown in broken lines) and which works in a weave forming a combination of chain stitches and linking weft threads.

According to the invention, a heating resistor (4), inserted in a continuous manner and which therefore forms, on the edge of the fabric produced, a float loop (F) joining two consecutive heating weft threads, is arranged inter-mittently between the weft threads (2). Although the heating resistor is inserted in the exemplary embodiment illustrated intermittently in the place of a reinforcing weft thread (2), it could be envisaged for an additional reinforcing thread to be laid parallel to this heating resistor.

In order to produce a material illustrated in FIG. 3 and which is obtained from the weave forming the subject of FIGS. 1 and 2, the following constituents are used as substance:

as longitudinal and transverse threads (1) and (2): polypropylene-(or polyethylene-)based fibers treated so as to be resistant to ultraviolet radiation, are very tough and consisting of eight ends of 1100 Dtex each;

as linking thread (3): a fiber of the same type but consisting of a single end of 1100 Dtex;

as heating wire: a complex thread comprising, on the one hand, a central core based on resistant cellulose fibers, having a good temperature resistance and around which the conducting wire proper is coiled helically. This assembly is protected by an extruded sheath. A complex conducting wire of this type has the property of being able to follow the deformations which the material according to the invention may undergo when subjected to loads.

EXAMPLE 2

This example illustrates an alternative material according to the invention and is illustrated by FIGS. 3, 4 and 5.

As compared with the material forming the subject of Example 1, in addition to the warp threads (1), weft threads (2), linking threads (3) and the heating element (4), additional filler threads (5) are incorporated during the knitting. Such filler threads (5) are arranged, in the embodiment illustrated, as threads laid weftwise either partially or over the entire width of the article between the reinforcing wefts proper (2). The function of such filler threads is to enable the spaces between the warp threads and the weft threads to be filled in, with the result that no shoot can grow through said materials once the material is in place. Bulked yarns such as, for example, polypropylene-based textured yarns will advantageously be used as filler threads.

For the two above examples, it has thus been possible to obtain a sheet having a strength in both directions (lengthwise and crosswise) of 50 kN for a deformation of 15 to 18% and which therefore enables the damage-free passage of the cultivation and transporting machines directly over the sheets to be obtained.

Moreover, as a result of the particular structure of the heating element involved in the composition of such a sheet, this element is not damaged during these deformations.

Figure 7:
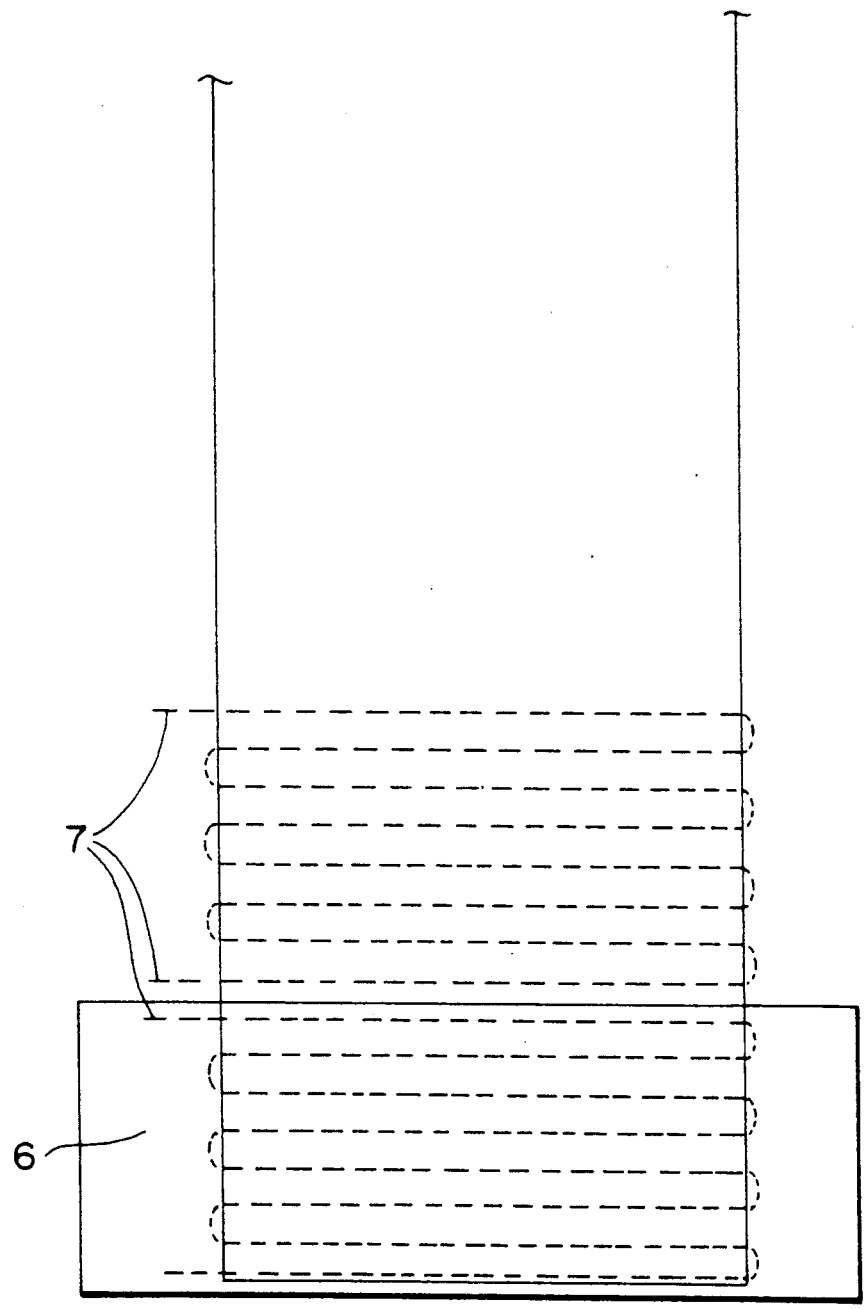
FIG. 7 is a diagram illustrating a form of implementation for the material according to the invention.

The material according to the invention, when it comes off the knitting machine, is therefore in the form of extremely long elements. They may be marketed either in continuous form or, preferably, as is apparent from FIG. 7, in the form of units designated by the general reference (6) with a specified length. When they are used, a plurality of units are connected by means of electrical connections (7) as a function of the length of the growing surface to be created.

Figure 8:
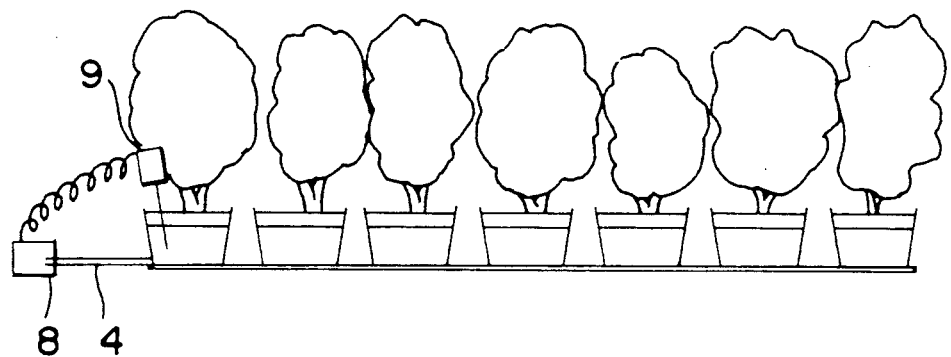
FIGS. 8 and 9 are respectively elevation and top views showing the manner in which the material is arranged relative to the seedlings t be cultivated.
Figure 9:
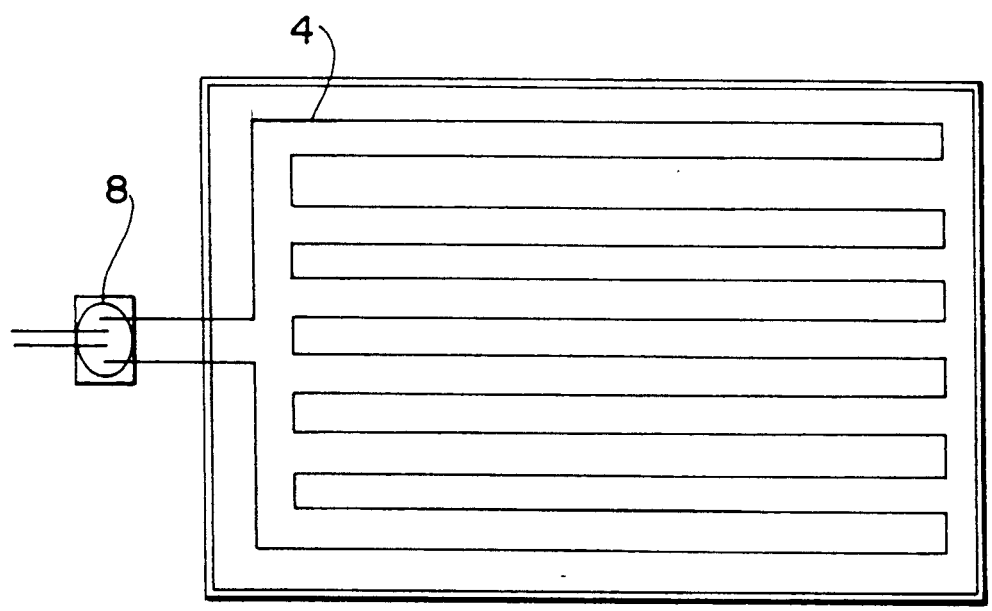

FIGS. 8 and 9 illustrate the manner in which a growing surface is created for container seedlings (7). After having prepared the soil, it only remains for the latter to have the structure according to the invention laid upon it and for the ends of the heating resistor which the material includes to be connected to a power supply system (8). This power supply system may optionally be coupled to a thermostat (9) which automatically starts up the heating system.

As compared with the prior solutions, the material according to the invention has very numerous advantages and enables platforms and zones for above-ground cultivation to be produced easily, in view of the technical properties which it has, namely in particular:

because of its mechanical properties:
  permitting a better distribution of the loads placed upon it and consequently the possibility of the movement and passage of heavy machines;
  an improvement in the underlying soil bearing capacity because of the distributing effect;
  optimization of the surfaces occupied;
  ease of organization in the accessibility of the platform;
  playing the role of a moisture distributor;
  since there is no need to change the underlying soil and since it is therefore possible to return if desired to an area suitable for arable farming, there is therefore no irreversible change to the purpose of the initial soil;

in view of the incorporation of the heating resistors which it includes, it also enables:
  the aboveground products to be safeguarded and their quality to be improved;
  the products to be able to be safeguarded in the event of frost and also the spring vegetative state to be maintained, and therefore the early sprouting to be modified and the sales period to be expanded. Furthermore, it provides an opportunity for new crops which it is currently impossible to envisage such as, for example, cuttings, multiplication of sensitive species.

The invention is not, of course, limited to the exemplary embodiments described above, in particular in terms of the density of the heating resistor inside the material. This density per meter squared may be adapted, as can the power, depending on the applications. Moreover, it could be possible for the structure of the heating resistor to be adapted, for example by covering it with an outer protective covering made in a non-oxidizing steel wire allowing earthing if necessary.

We claim:

1. A textile material for resisting and distributing loads, comprising:
    a first sheet of longitudinal threads;
    a second sheet of transverse threads which extend substantially perpendicular to the threads of said first sheet, said second sheet being superposed onto said first sheet;
    at least one continuous heating resistor superposed onto said first sheet such that a central axis of said resistor is parallel to and coplanar with central axes of the threads of said second sheet; and
    a meshed-thread structure woven to join the threads of said second sheet and said resistor with the threads of said first sheet;
    wherein said second sheet, said first sheet and said resistor each have a mechanical strength which enables elongation without breakage when subjected to the loads.

2. The material of claim 1, wherein said material is in a form of an openwork grid in which the threads of said first sheet and the threads of said second sheet are spaced apart from each other.

3. The material of claim 1, wherein the threads of said first sheet and the threads of said second sheet comprise polypropylene and polyethylene based fibers which are resistant to ultraviolet radiation.

4. The material of claim 1, wherein said resistor comprises a conductive wire coiled helically around an extendable core and is covered by a protective sheath.

5. The material of claim 4, wherein said protective sheath is covered by non-oxidizing steel wire.

6. The material of claim 1, further comprising filler threads arranged to completely cover an area selected from the group consisting of an area between the threads of said first sheet and an area between the threads of said second sheet.

7. The material of claim 6, wherein said filler threads consist of textured yarns.

* * * * *